C. LE G. FORTESCUE.
CIRCUIT INTERRUPTING DEVICE.
APPLICATION FILED AUG. 11, 1913. RENEWED DEC. 16, 1915.
1,184,846. Patented May 30, 1916.
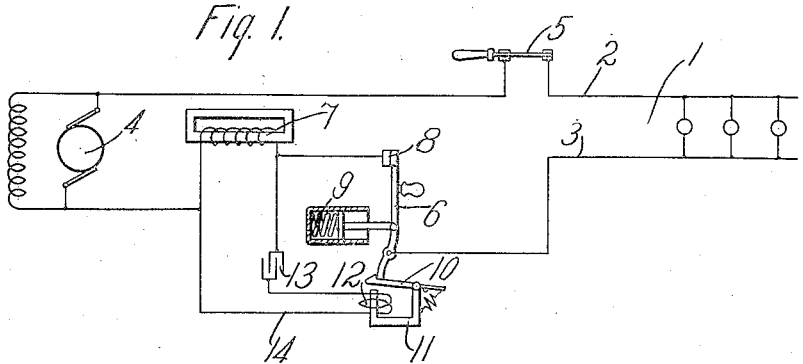
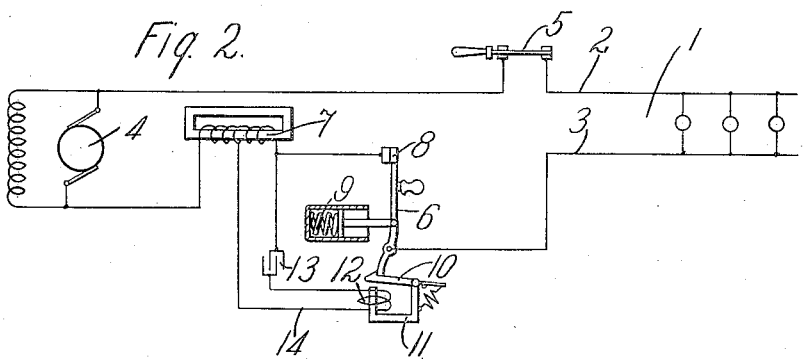
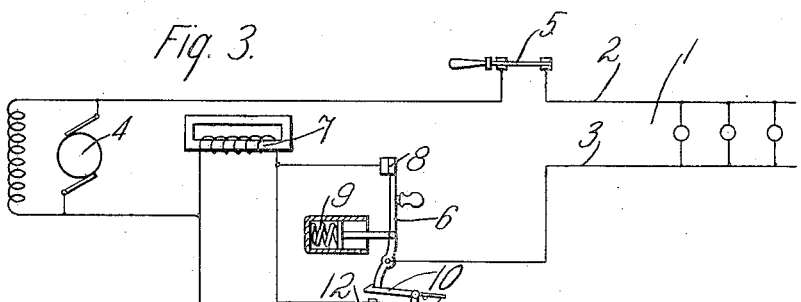
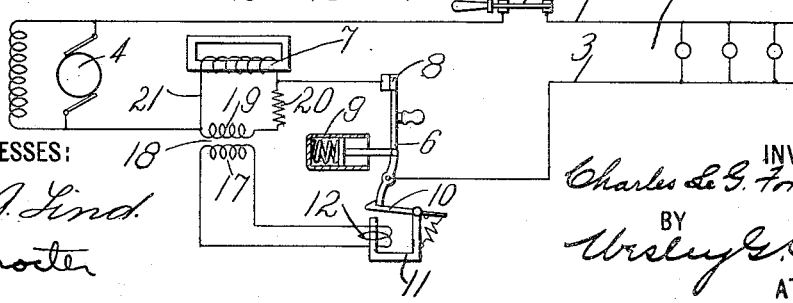
INVENTOR
Charles Le G. Fortescue
BY
ATTORNEY
WITNESSES:
Fred A. Lind.
J. A. Procter

UNITED STATES PATENT OFFICE.

CHARLES LE G. FORTESCUE, OF PITTSBURGH, PENNSYLVANIA, ASSIGNOR TO WESTING-HOUSE ELECTRIC AND MANUFACTURING COMPANY, A CORPORATION OF PENNSYLVANIA.

CIRCUIT-INTERRUPTING DEVICE.

1,184,846. Specification of Letters Patent. Patented May 30, 1916.

Application filed August 11, 1913, Serial No. 784,088. Renewed December 16, 1915. Serial No. 67,299.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Circuit-Interrupting Devices, of which the following is a specification.

My invention relates to means for automatically interrupting electric circuits under predetermined conditions.

The object of my invention is to provide an automatic circuit interrupter which will operate, in anticipation of current disturbances on the circuit with which it is associated, to interrupt the circuit before the current has sufficient time to attain a dangerous or destructive value.

Circuit breakers of the usual type operate directly in accordance with an excess of current. When a momentary overload occurs the tripping magnet is energized and tends to trip the breaker but the action is relatively slow, thus allowing a destructive current to flow and perhaps do a great amount of damage before the circuit is broken. My invention relies upon the change in voltage across an inductor to actuate an auxiliary circuit containing a trip coil. My invention really anticipates a destructive current and, when used in conjunction with a high speed breaker, provides an effective and reliable protective device.

Figure 1 of the accompanying drawings is a diagrammatic view of a circuit interrupter embodying my invention. Fig. 2 is a diagrammatic view of a circuit interrupter embodying a modified form of my invention. Fig. 3 is a diagrammatic view of a circuit interrupter embodying another modification and Fig. 4 is a diagrammatic view of a circuit interrupter embodying still another modification.

Referring to the drawings, my invention is incorporated in an electrical circuit 1, receiving current through its conductors 2 and 3 from a direct current generator 4. In circuit with the conductor 2 is a knife switch 5 and in circuit with the conductor 3 is a circuit interrupter 6 and an inductor 7. The circuit breaker 6 comprises contact members 8, an operating spring 9, a latch 10 and a tripping magnet 11, provided with a coil 12.

Referring particularly to Fig. 1, the coil 12 is connected in series with a condenser 13 forming an auxiliary circuit 14 which is placed in parallel with the inductor 7. Referring particularly to Fig. 2, the circuit 14 is connected in parallel with only a part of the inductor 7. Referring to Fig. 3, the coil 12 is connected in series with a spark gap 15 forming an auxiliary circuit 16 which is connected in parallel with the inductor 7. With reference to Fig. 4, the coil 12 is connected to a secondary winding 17 of a transformer 18, the primary winding 19 of which is in series with a resistor 20 forming a circuit 21 which is connected in parallel with the inductor 7.

When a disturbance occurs in the circuit and a momentary rush of current is set up which usually rises to a destructive value, it is necessary to have a device which will interrupt the circuit and thus protect it. The normal direct current will not have any effect on the trip coil 12 because there is either a condenser 13 or a spark gap 15 in series with it, as shown in Figs. 1, 2 and 3, which prevents any flow of direct current of normal voltage. The condenser circuit has a definite potential across it depending upon the drop across the reactor 7. When there is a momentary rush of current, however, the drop across the reactor 7 changes and since the charging current of a condenser depends upon the voltage across the condenser and the rate of change of this voltage, there will be a flow of current through the condenser circuit and the coil 12 which releases the latch 10 and permits the operating spring 9 to open the circuit by separating the contact members 8.

The operation of the arrangement shown in Fig. 3 is similar to that of Figs. 1 and 2 in that the current is choked or retarded by the inductor 7 and the voltage rises across its terminals, causing the spark gap 15 to break down which permits the current to flow through the coil 12 to release the latch 10 and, as hereinbefore explained, to operate the spring 9 to interrupt the circuit.

The arrangement, as shown in Fig. 4, is similar in its operation in that the momentary rush of current is impeded in its course through the inductor 7 and hence the coil 19 and the resistor 20 offer a lower ohmic resistance to the flow of current which will take the path of least resistance. The rapid change of current in the coil 19 of the transformer 18 will induce a current in the secondary winding 17 of the transformer, allowing enough current to flow in the coil 12 to open the circuit, as hereinbefore described.

My invention may be applied, by those skilled in the art, to any type of circuit breaker without departing from my invention as set forth in the appended claims.

I claim as my invention:

1. An interrupter for electric circuits comprising relatively movable contact members, a reactor connected in series relation to the circuit and means connected in circuit with the reactor and dependent upon a predetermined rate of electrical change in the circuit to cause the disengagement of the contact members.

2. An interrupter for an electrical circuit comprising a reactor connected in series relation to the circuit, relatively movable contact members and means connected in shunt relation to the said reactor for disengaging the contact members upon a predetermined rate of electrical change in the circuit.

3. An interrupter for an electric circuit comprising a reactor connected in series with the circuit, an auxiliary circuit connected in shunt relation to the reactor comprising means for preventing current at the normal voltage from traversing the same and a trip coil that is adapted to be excited when the current that traverses the main circuit instantly increases.

4. An interrupter for electric circuits comprising relatively movable contact members, a reactor connected in series relation to the circuit, and an auxiliary circuit in shunt relation to the said reactor comprising a condenser and a trip coil, said auxiliary circuit being so proportioned that current traverses the same when the voltage across the said reactor changes rapidly.

5. An interrupter for a direct-current circuit comprising relatively movable contact members, a reactor connected in series relation to the circuit, and an auxiliary circuit comprising a trip coil, said auxiliary circuit being so proportioned that current traverses the same only when the voltage across the reactor changes rapidly.

6. An interrupter for a direct-current circuit comprising a reactor connected in series with the circuit and a trip coil circuit connected in shunt relation to the reactor and so proportioned that current traverses the same only when the voltage across the reactor changes rapidly.

7. In an interrupting device for an electric circuit, the combination with a reactor connected in series relation to the circuit, of an auxiliary circuit having a voltage impressed across its terminals substantially proportional to the potential drop across the said reactor and comprising a condenser and a trip coil, the said auxiliary circuit being so proportioned that current will traverse the same only when the current in the main circuit fluctuates rapidly.

8. A system of distribution comprising an electric circuit, a direct-current source of energy, a circuit interrupter, electrical means for causing the interrupter to open the circuit, a reactor connected in series relation to the circuit and a condenser connected across the said reactor in series with the said electrical means.

9. A system of distribution comprising an electric circuit, a direct-current source of energy, a circuit interrupter, a trip coil for causing the interrupter to open the circuit, a reactor connected in series with the circuit and a condenser connected across the terminals of the said reactor and in series with the said trip coil.

10. An interrupter for electric circuits comprising a reactor connected in series with the circuit, a condenser connected across the terminals of the said reactor and means dependent upon a predetermined rate of condenser discharge for actuating the interrupter to open the circuit.

11. A system of distribution comprising a source of energy, a reactor connected in series with the circuit, a condenser connected across the terminals of the said reactor and means connected in the condenser circuit and dependent upon a predetermined electrical change in the condenser circuit for interrupting the distributing circuit.

12. A system of distribution comprising a source of energy, a distributing circuit, an induction device in the said circuit, a circuit interrupter, means for holding the circuit interrupter closed, and a condenser and a trip coil connected in shunt circuit relation to the inductance device for releasing the circuit interrupter in anticipation of a predetermined electrical change in the distributing circuit.

13. An interrupter for an electric circuit comprising relatively movable contact members, an inductance device included in the circuit, and a condenser and a trip coil connected in series, said condenser and trip coil being connected in shunt-circuit relation to the inductance device for separating the contact members in anticipation of a predetermined rate of electrical change in the said circuit.

14. In an interrupting device for an electric circuit, the combination with a reactor connected in series relation to the circuit, of a circuit in shunt relation to the said reactor comprising a spark gap and means for tripping the interrupting device when the voltage across the terminals of the reactor reaches a predetermined value.

15. In an interrupting device for an electric circuit, the combination with a reactor connected in series relation to the circuit, of a circuit in shunt relation to the said reactor comprising a condenser and means for tripping the interrupting device when the voltage across the terminals of the reactor reaches a predetermined value.

In testimony whereof, I have hereunto subscribed my name this 1st day of August, 1913.

CHARLES Le G. FORTESCUE.

Witnesses:
B. B. HINES,
L. E. CUNNINGHAM.